US009026176B2

United States Patent
Wang et al.

(10) Patent No.: US 9,026,176 B2
(45) Date of Patent: May 5, 2015

(54) MESSAGE-TRIGGERED VOICE COMMAND INTERFACE IN PORTABLE ELECTRONIC DEVICES

(71) Applicants: Shyh-Jye Wang, Irvine, CA (US); Chi-Ping Chung, Irvine, CA (US)

(72) Inventors: Shyh-Jye Wang, Irvine, CA (US); Chi-Ping Chung, Irvine, CA (US)

( * ) Notice: Subject to any disclaimer, the term of this patent is extended or adjusted under 35 U.S.C. 154(b) by 241 days.

(21) Appl. No.: 13/892,299

(22) Filed: May 12, 2013

(65) Prior Publication Data
US 2014/0337028 A1   Nov. 13, 2014

(51) Int. Cl.
| | |
|---|---|
| *H04M 1/60* | (2006.01) |
| *H04M 1/27* | (2006.01) |
| *G10L 15/22* | (2006.01) |
| *G10L 15/00* | (2013.01) |

(52) U.S. Cl.
CPC ............ *H04M 1/6075* (2013.01); *G10L 15/22* (2013.10); *G10L 15/005* (2013.01); *H04M 1/271* (2013.01); *H04M 2201/40* (2013.01)

(58) Field of Classification Search
CPC ..... G10L 15/265; G10L 15/22; G10L 15/005; H04M 2201/40; H04M 1/271; H04M 1/6041; H04M 1/6075

USPC .......................................................... 455/563
See application file for complete search history.

(56) References Cited

U.S. PATENT DOCUMENTS

| | | | | |
|---|---|---|---|---|
| 6,212,408 | B1 * | 4/2001 | Son et al. ...................... | 455/563 |
| 2009/0259472 | A1 * | 10/2009 | Schroeter ...................... | 704/260 |
| 2010/0305807 | A1 * | 12/2010 | Basir et al. ...................... | 701/33 |
| 2011/0301958 | A1 * | 12/2011 | Brush et al. ................... | 704/275 |
| 2013/0085755 | A1 | 4/2013 | Bringert et al. | |
| 2014/0207468 | A1 * | 7/2014 | Bartnik ......................... | 704/275 |
| 2015/0081296 | A1 * | 3/2015 | Lee et al. ....................... | 704/239 |

* cited by examiner

*Primary Examiner* — John Villecco

(57) ABSTRACT

The embodiments provided herein are directed to a system and method of message-triggered voice command interface in portable electronic devices. The voice command interface is normally not activated until a message (e.g., an e-mail, a text message, or a voice mail) has been received by a portable electronic device. The arriving of a message is used to trigger the voice command interface by activating one or more speech recognition routines in a predetermined time period corresponding to the one or more speech recognition routines. The voice command interface come to an end when the predetermined time period expires or the user has no further commands.

10 Claims, 3 Drawing Sheets

MESSAGE-TRIGGERED VOICE COMMAND INTERFACE IN PORTABLE ELECTRONIC DEVICES

FIELD OF THE INVENTION

The embodiments described herein relate generally to activation of voice command interface, more particularly, to a system and method of message-triggered voice command interface in portable electronic devices.

BACKGROUND OF THE INVENTION

A portable electronic device is typically a small computing or communicating device with a display. A portable electronic device typically can run various types of software applications, known as apps. Most portable electronic devices can also be equipped with Wi-Fi, Bluetooth and Global Positioning System (GPS) capabilities that allow connections to the Internet and other Bluetooth capable devices such as a vehicle or a microphone headset. A camera or media player feature for video or music files can also be found on these devices. A portable power supply such as a lithium battery is typically used as the power source. Examples of portable electronic devices are smartphones (e.g., iPhone® of Apple Inc.), tablet computers (e.g., iPad® of Apple Inc.), wearable computers (e.g., Google Glass of Google), and watch phones (or smartwatches).

Some portable electronic devices are configured to perform speech (or voice) recognition function for interacting with a user's voice command. Typically, activating a voice command interface on a portable electronic device requires a physical action by the user. For example, to activate a voice command interface on a portable electronic device, the user may be required to press or hold a real or virtual button (or switch) on the portable electronic device. This physical activation of the voice command interface is troublesome, and sometimes dangerous, for example, when the user is driving a vehicle.

Alternatively, a voice command interface on a portable electronic device can continuously run as long as the portable power supply is providing power source to the portable electronic device. Although this is convenient to the user, however, a continuously run voice command interface wastes battery power when voice command interface is not required. This may be due to the fact that in order to perform voice command interface, a portable electronic device typically requires at least a microphone, an Analog-to-Digital Converter (ADC), a signal processor, a Digital-to-Analog Converter (DAC), a speaker, and other digital or analog circuits to be put in work and they are typically power consuming.

Alternatively, a voice command interface on a mobile computing device can be activated and continually run when the device is receiving power from an external power source, while the voice command interface is deactivated when the device is not receiving power from an external power source. Although this type of configuration conserves battery power, however, this type of configuration lost its portability because the voice command interface is only activated when the device is receiving power from an external power source.

In addition, a continuously run voice command interface may annoy or interrupt the user when the portable electronic device accidently "hears" a false command, which may be generated from the environment, and attempts to interact with the user. In addition, on some occasions, the user may not want private information to be played by the portable electronic device when other people are around.

Therefore, it would be desirable to have a portable electronic device that physical activation of the voice command interface on the device is not required, battery power can be saved when the voice command interface is not required, the voice command interface can be activated without relying on external power source, the user may not be interrupted by the portable electronic device accidently, and the user can control whether the content of the message is to be shared with other people around.

SUMMARY OF THE EMBODIMENTS

The embodiments described herein relate generally to activation of voice command interface, more particularly, to a system and method of message-triggered voice command interface in portable electronic devices. The voice command interface is normally not activated until a message (e.g., an e-mail, a text message, or a voice mail) has been received by a portable electronic device. The arriving of a message is used to trigger the voice command interface by activating one or more speech recognition routines in a predetermined time period corresponding to the one or more speech recognition routines. The voice command interface come to an end when the predetermined time period expires or the user has no further commands.

In some embodiments, the method for activating a voice command interface in a portable electronic device comprises the steps of: receiving a message by the portable electronic device; starting a first timer having a predetermined expiration time period; activating a first speech recognition routine; and determining whether a predefined keyword is detected before the first timer expires. In one embodiment, the method further comprises the step of determining whether a voice command interface is available before the step of receiving a message by the portable electronic device. In one embodiment, the method further comprises the step of deactivating the first speech recognition routine after the first timer has been expired.

In one embodiment, the method further comprises the step of providing a voice brief corresponding to the message if the predefined keyword is detected. In one embodiment, the method further comprises the step of starting a second timer having a second predetermined expiration time period after the step of providing a voice brief corresponding to the message if the predefined keyword is detected. In one embodiment, the method further comprises the step of activating a second speech recognition routine after the step of starting a second timer. In one embodiment, the method further comprises the step of determining whether a predefined command string is detected after the step of activating a second speech recognition routine. In one embodiment, the method further comprises the step of sending a returned message after the step of determining whether a predefined command string is detected. In one embodiment, the method further comprises the step of deactivating the second speech recognition routine after the second timer expires.

In one embodiment, the detected keyword is a password. In one embodiment, the password is a combination of a speech word and the user's voice characteristics. In one embodiment, the detected keyword is a password followed by a command string. In one embodiment, the predefined keyword is a command string.

In some embodiments, the method for activating a voice command interface in a portable electronic device comprises the steps of: activating a first speech recognition routine after a message is received; and determining whether a predefined keyword is detected within a predetermined expiration time period. In one embodiment, the method further comprises the step of determining whether a voice command interface is available before the step of activating a first speech recognition routine. In one embodiment, the method further comprises the step of providing a voice brief corresponding to the message if the predefined keyword is detected.

In some embodiments, the portable electronic device comprises: a microphone; a speaker; a display; and a processor configured to activate a speech recognition routine after a message has been received by the portable electronic device and determine whether a predefined keyword is detected within a predetermined expiration time period. In one embodiment, the portable electronic device is a smartphone. In one embodiment, the portable electronic device is a tablet computer. In one embodiment, the message is a text message. In one embodiment, the message is an e-mail.

One advantage of the system and method in accordance with the embodiments described herein is that physical activation of the voice command interface on a portable electronic device is not required. In addition, battery power can be saved when the voice command interface is not required. In addition, the voice command interface can be activated without relying on external power source so that the user can enjoy true portability of the portable electronic device. In addition, the user may not be interrupted by the portable electronic device accidently. In addition, the user can control whether the content of the message is to be shared with other people around.

DETAILED DESCRIPTION

The embodiments described herein are directed to a system and method of message-triggered voice command interface in portable electronic devices. The following detailed description includes references to the accompanying figures. The exemplary embodiments outlined in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Figure 1:
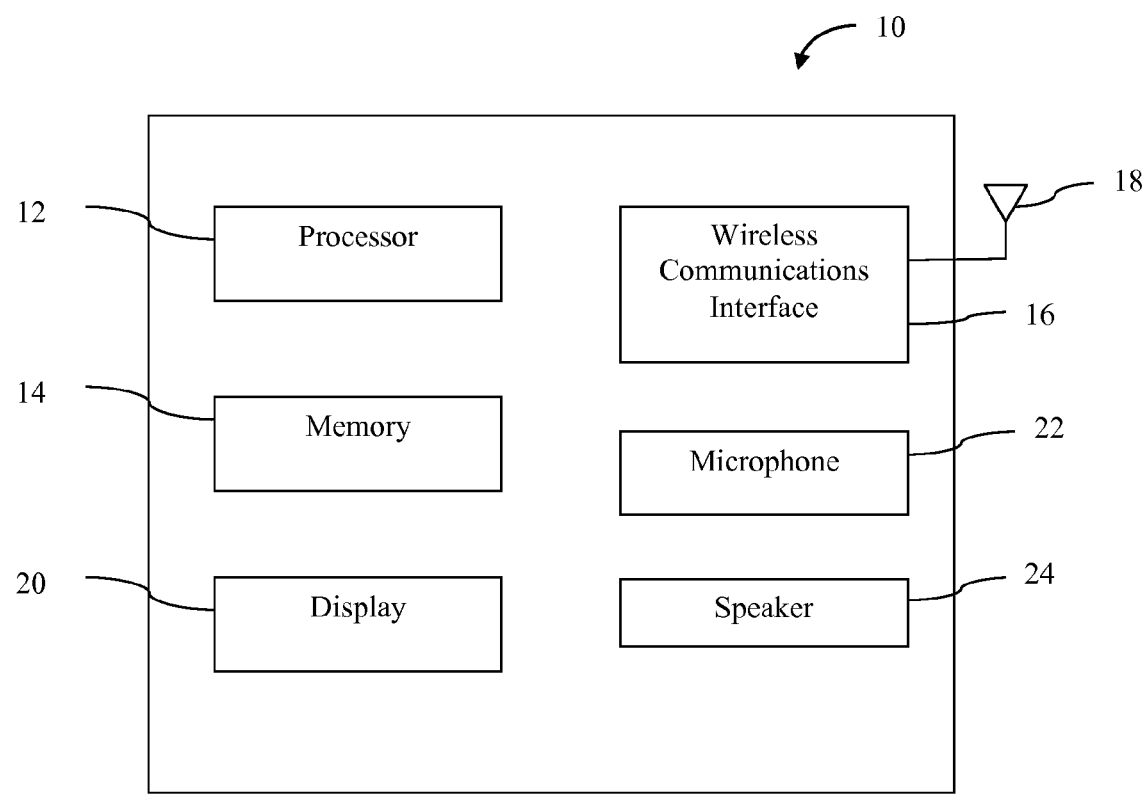
FIG. 1 is a schematic illustration showing an exemplary block diagram of a portable electronic device according to some embodiments.

FIG. 1 is a schematic illustration showing an exemplary block diagram of a portable electronic device 10 according to some embodiments. In one embodiment, the portable electronic device 10 is a mobile phone (e.g., smartphone). In one embodiment, the portable electronic device 10 is a portable computer (e.g., tablet computer). In one embodiment, the portable electronic device 10 is a wearable computer (e.g., Google Glass of Google). In one embodiment, the portable electronic device 10 is a watch phone. In other embodiments, the portable electronic device 10 can be other type of devices that can be controlled via voice commands.

The portable electronic device 10 may comprise, for example, a processor 12, a memory 14, a wireless communications interface 16, an antenna 18, a display 20, a microphone 22, and a speaker 24. Individual components 12, 14, 16, 20, 22, 24 can be connected via one or more data and/or address busses (not shown) or similar communications connections that are configured to enable the individual components to send and receive data to and from other components of the portable electronic device 10.

In some embodiments, the processor 12 is selected from any type of general purpose or special purpose processors. Examples of processors are processors from Intel, ARM, and Advanced Micro Devices (AMD), etc. In addition, a Digital Signal Processor (DSP) and a Application Specific Integrated Circuit (ASIC) which performs the function of a processor are also examples of processors. In some embodiments, two or more processors arranged in a multi-processing configuration can also be employed.

The memory 14 can be configured to store data as well as executable program codes (or instructions). Examples of memory are volatile memory (e.g., RAM) and non-volatile memory (e.g., ROM), etc.

The wireless communications interface 16 may include any type of wireless communications interface configured to transmit and receive data according to any of a number of different wireless communications protocols. Examples of wireless communications protocols are Bluetooth, IEEE 802.11 or other Wi-Fi variant, Code-Division Multiple Access (CDMA), Global System for Mobile Communications (GSM), Worldwide Interoperability for Microwave Access (WiMAX), etc. The antenna 18 is preferably coupled to the wireless communications interfaces 16 for receiving or transmitting signals. In one embodiment, the portable electronic device 10 may use the wireless communications interface 16 to communicate with a server that performs speech recognition on behalf of the portable electronic device 10.

In addition, the portable electronic device 10 can have wired interface configured to transmit and receive data according to any of a number of different communications protocols, such as Universal Serial Bus (USB), Ethernet, IEEE 1394 (or Firewire), or any other type of serial or parallel data communications protocols. The wired interfaces and wireless interface 16 may be configured to communicate with other computing or communications devices via a network (e.g., the Internet) and/or communicate with peripheral devices (e.g., disk drives) via Bluetooth, USB, or similar connections.

The display 20 may include a Liquid Crystal Display (LCD), a plasma display, an Organic Light-Emitting Diode (OLED) display, or other similar type of display devices that can be configured to display a graphical user interface and/or other information to a user. In some embodiments, the display 20 preferably includes a touch-screen interface or other touch-sensitive components to enable a user to enter commands or other information to (or otherwise interact with) the portable electronic device 10. In some embodiments, the display 20 can be configured to generate and display a virtual keyboard for data entry by a user. In one embodiment, the display 20 is a Head-Up Display (HUD). In one embodiment, the display 20 is a Head-Mounted Display (HMD).

The microphone 22, or other similar type of sound detection devices, can be configured to detect and receive sound waves and convert the sound waves into electrical signals. The electrical signals can then be processed or transformed by the processor 12. In one embodiment, the microphone 22 is an electret microphone. The portable electronic device 10 may include an ADC to convert analog signals received from the microphone 22 into digital signals to be processed or transformed by the processor 12.

The speaker 24 can be formed by one or more loudspeakers or similar electro-acoustic transducer devices that are configured to generate sound waves in response to electrical audio signals processed or transformed by the processor 12. The speaker 24 can be configured to play a ringtone or notification sound in connection with the arrival of a message (e.g., a text message or an e-mail) received by the portable electronic device 10. In addition, the speaker 24 can be configured to play a voice message in response to electrical audio signals processed or transformed by the processor 12. The portable electronic device 10 may include a DAC to convert digital signals processed or transformed by the processor 12 into analog signals that can be played by the speaker 24.

In one embodiment, the portable electronic device 10 may optionally include a physical keyboard (not shown). However, a keyboard (virtual or physical) is not required in all embodiments.

In one embodiment, the portable electronic device 10 may also include one or more external switches or buttons (not shown) to turn the portable electronic device 10 on or off, to wake the device from a sleep mode, or other similar functions.

In one embodiment, the portable electronic device 10 may also include one or more sensors (not shown). The sensors may include one or more image sensors, accelerometers, GPS sensors, temperature sensors, or any other type of sensor that may be desirable to integrate with the portable electronic device 10.

In one embodiment, the portable electronic device 10 may include an eyeglass frame or frames to be put on by a user. The eyeglass frame or frames can be used to mount the portable electronic device 10. In one embodiment, the portable electronic device 10 may include a belt to be worn by a user.

Figure 2:
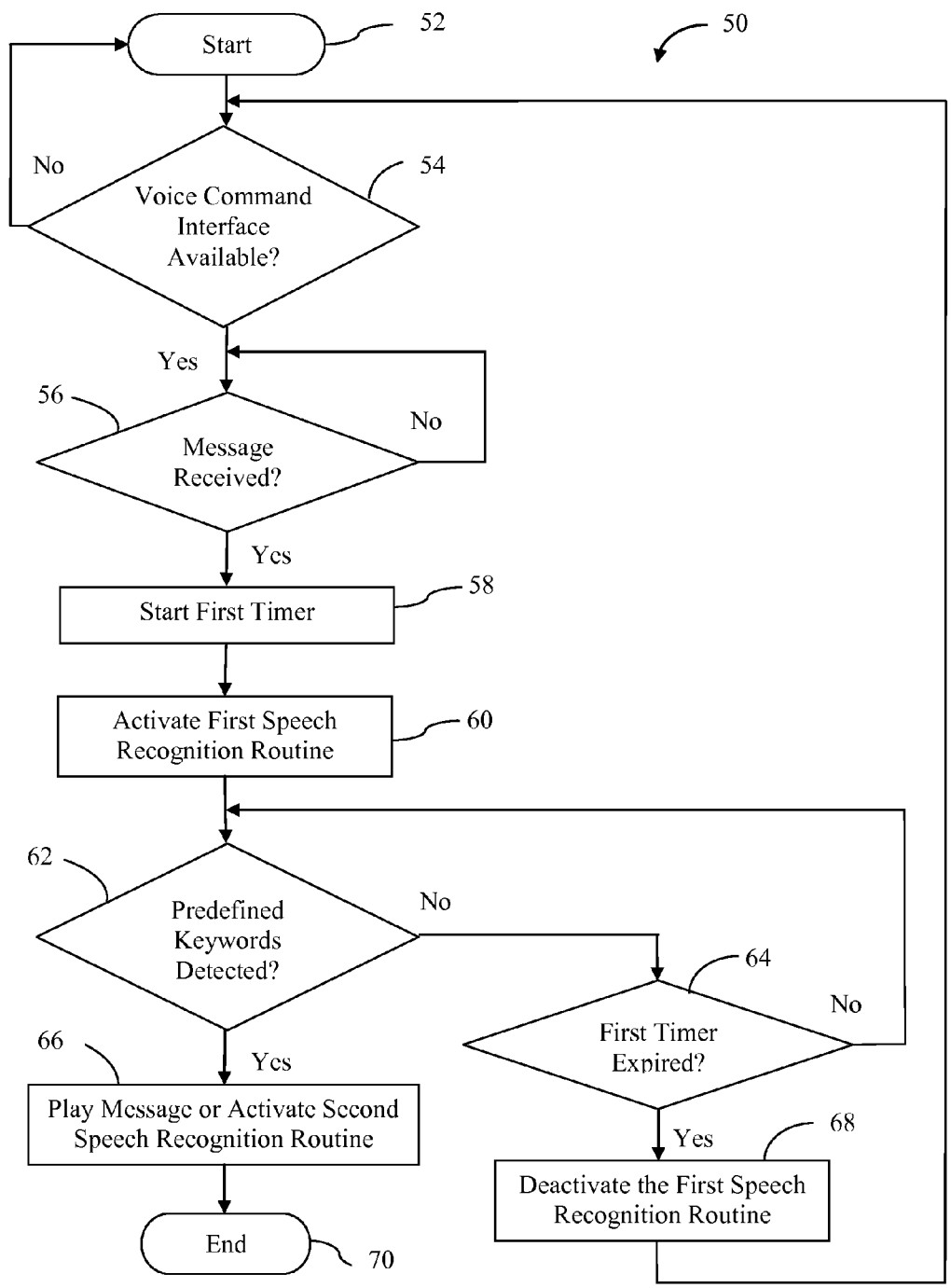
FIG. 2 is a flowchart diagram showing an exemplary process for message-triggered voice command interface of a portable electronic device according to some embodiments.

FIG. 2 is a flowchart diagram showing an exemplary process 50 for a message-triggered voice command interface of a portable electronic device 10 according to some embodiments. The process 50 starts at block 52, wherein the portable electronic device 10 is preferably in normal mode, standby mode, sleep mode, or other non-power-down modes. The microphone 22 is preferably turned off at block 52. The process 50 may then advance to block 54.

At block 54, the portable electronic device 10 may determine whether the voice command interface is available so that the voice command interface can be activated in later steps if the voice command interface is available. In one embodiment, the process 50 determines whether related setting (or settings) for voice command interface is appropriately set to the portable electronic device 10. In one embodiment, the portable electronic device 10 has a control of the availability of the voice command interface.

If all ringtones and notification sounds of a portable electronic device have been turned off, it would be considered that the voice command interface is not desirable by the user. In one embodiment, if all ringtones and notification sounds of the portable electronic device 10 have been turned off, the function of voice command interface will not be available.

If the portable electronic device 10 is switched into a silent mode, vibrate mode, or airplane mode, it would also be considered that the voice command interface is not desirable by the user. In one embodiment, if the portable electronic device 10 is switched into a silent mode, vibrate mode, or airplane mode, the function of voice command interface will not be available.

However, even if the voice command interface is available, the portable electronic device 10 does not perform any speech recognition function until it is triggered by a message, which will be described in more detail hereafter. In one embodiment, if the voice command interface is set to be available, when the voice command interface is not activated, electrical circuits associated with the voice command interface consume substantially the same power as that when the voice command interface is not available. When the voice command interface is available, the process 50 advances to block 56.

At block 56, the process 50 determines whether a message has just been received by the portable electronic device 10. A message can be an e-mail message, a text message, a voice mail, a tweet, or an un-answered phone call, or other notifications. The portable electronic device 10 may have a flag (or register) to record whether a message has just been received by the portable electronic device 10. The flag can be reset at block 52. If a message has just been received at any time at block 56, the flag can then be set.

When a message has been received, the portable electronic device 10 may play a ringtone or a notification sound from the speaker 24 to notify the user that a message has just arrived. Ringtones or notification sounds can be setup as default setting by the manufacturer. Alternatively, ringtones or notification sounds can be selected by the user. For example, an e-mail, a text message, a voice mail each can have an associated ringtone or notification sound.

If no message is received at block 56, in one embodiment, the process 50 stays at block 56 and keeps on waiting for a message as shown in FIG. 2. Alternatively, the process 50 may go to block 52 or block 54. However, if at block 56, the process 50 determines that a message has just been received by the portable electronic device 10, the process 50 then advances to block 58. In one embodiment, the flag is reset again when the process 50 advances to block 58.

At block 58, the process 50 may start a first timer. The first timer can be set to have a predetermined expiration time period. In one embodiment, the first timer is set to be expired in 5 seconds. In some other embodiments, an expiration time period of shorter than 5 seconds is used. In some other embodiments, an expiration time period of longer than 5 seconds is used. However, an expiration time period of longer than 15 seconds is not preferable. In one embodiment, the predetermined expiration time period is set by the manufacturer. Alternatively, the predetermined expiration time period can be selected by the user.

The first timer can be an up-count timer, a down-count timer, or other timers. In one embodiment, the first timer is a dedicated electrical circuitry of the portable electronic device 10 for performing the function of counting. In another embodiment, the first timer is a software or firmware installed or embedded in the portable electronic device 10 for performing a timer function.

After the first timer has been started, the process 50 may advance to block 60.

At block 60, the portable electronic device 10 may activate a first speech recognition routine. In one embodiment, the portable electronic device 10 turns on the microphone 22 at block 60 if it has not already been turned on. The portable electronic device 10 may then sample sound waves received via the microphone 22. In one embodiment, the sampling rate is 8 kHz.

The sampled sound waves can then be processed or transformed by the processor 12 to detect any speech words. In some embodiments, the sampled sound waves are analyzed with any of a number of speech or voice recognition algorithms now know or later developed to obtain text. In one embodiment, computer codes that implement the speech or voice recognition algorithms are stored in memory 14 and can be executed or transformed by the processor 12.

In one embodiment, the process 50 may advance to block 62 while the first speech recognition routine continues to run at block 60.

At block 62, speech words, in text form, can be detected and analyzed by the processor 12 to determine whether that include one or more predefined keywords. In some embodiments, the one or more predefined keywords can be a password, a password followed by a command string, or simply a command string. In one embodiment, a portion of the one or more predetermined keywords are provided by the manufacturer of the portable electronic device 10.

In one embodiment, the password is predefined by the user. The password can be a speech word or a sequence of number or a combination of the above previously set or entered into the portable electronic device 10 via typing or speaking For example, the password can be simply "grandma" set by the user.

The sound of each person's voice is unique not only because of the actual shape and size of the person's vocal cords but also due to the size and shape of the rest of that person's body, especially the vocal tract, and the manner in which the speech sounds are habitually formed and articulated. In one embodiment, the "password" is a combination of a predefined password and the voice characteristics of the user so that a speaker authentication can be performed.

If the detected speech words do not include at least one of the one or more predefined keywords at block 62, then the process 50 may advance to block 64.

At block 64, the portable electronic device 10 may determine whether the first timer set at block 58 has been expired. If the first timer has not been expired, the process 50 may return to block 62. However, if at block 64, the first timer has been expired, which may indicate that the user does not wish to use the voice command interface to communicate with the portable electronic device 10 at this time, the process 50 may advance to block 68 to deactivate the first speech recognition routine. The process 50 may then return to block 52.

At block 62, if the speech words include at least one of the one or more keywords, then the process 50 may advance to block 66.

At block 66, the portable electronic device 10 may play a voice brief about the message, play the whole message in voice, or launches a second speech recognition routine, in response to the result determined at block 62.

Figure 3:
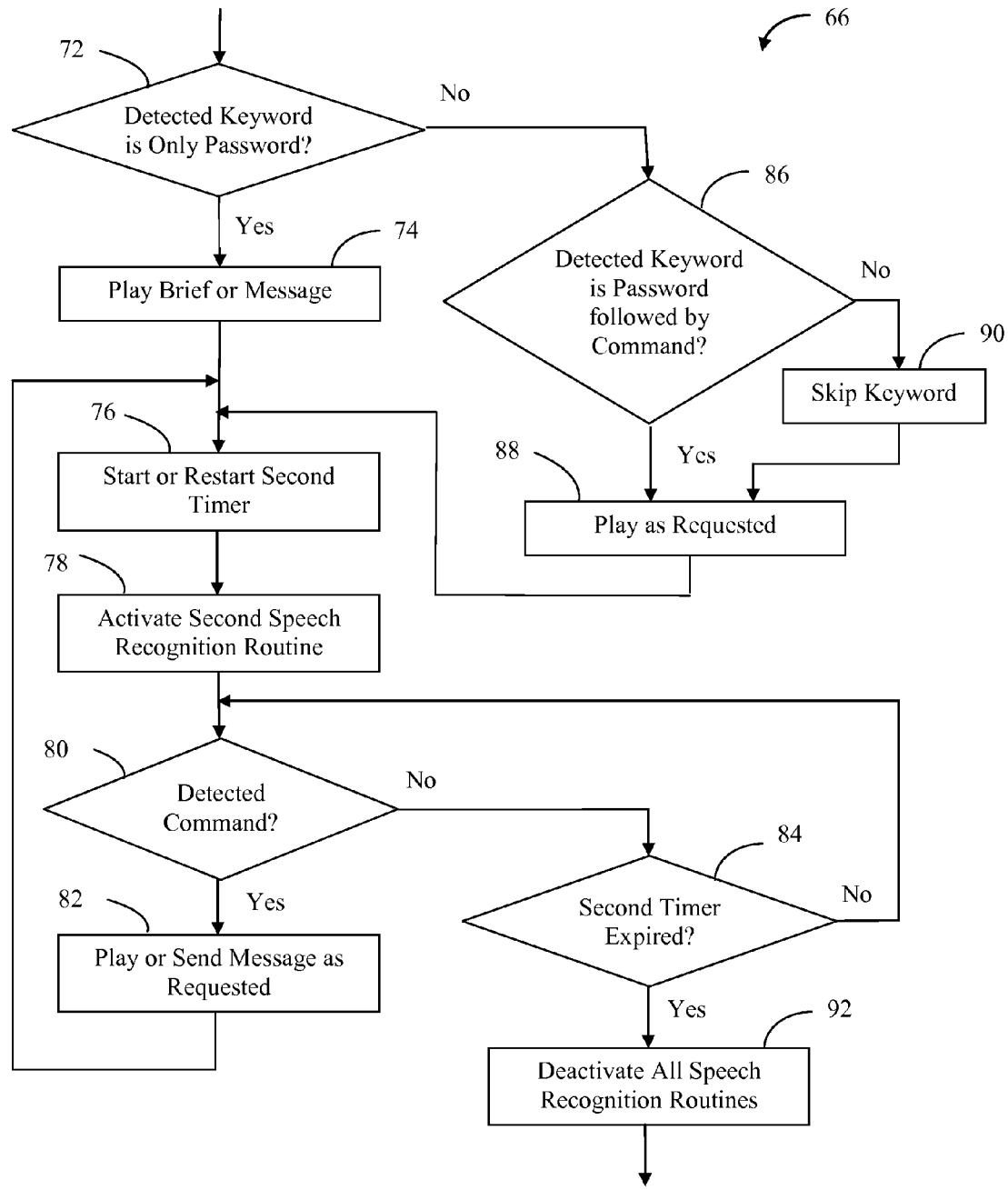
FIG. 3 is a flowchart diagram showing a further detail of one block of the exemplary process of FIG. 2.

FIG. 3 is a flowchart diagram showing a further detail of block 66 of the exemplary process 50 of FIG. 2.

At block 72, if the detected keyword only contains a password, the portable electronic device 10 may advance to block 74.

At block 74, the portable electronic device 10 may play a voice brief (or a short background introduction) via the speaker 24 about the received message. For example, if the received message is an e-mail sent from Uncle John, the short background introduction can be "an e-mail sent from Uncle John has just been received; the e-mail is titled 'what's new.'"

In one embodiment, if the received message is a text message, the portable electronic device 10 may play the whole message via the speaker 24 about the received message. For example, if the received message is a text message sent from Auntie Annie, the portable electronic device 10 may play "a text message sent from Auntie Annie has just been received; the message is the following: 'I will come over in one hour.'"

In one embodiment, the portable electronic device 10 can be configured to launch a text to voice translator and play a voice brief or contents of the received e-mail or text message through the speaker 24 in voice form.

Some text messages or e-mails may contain emoticons, emojis, or stickers, etc. to express the feeling or mood of the sender. In addition to text to voice translation, the portable electronic device 10 can be configured to described emoticons, emojis, or stickers used in the message. For example, if the received text message sent from Auntie Annie is "I will come over in one hour :)," the portable electronic device 10 may play "a text message with a happy face emoticon sent from Auntie Annie has just been received; the message is the following: 'I will come over in one hour.'"

At block 76, the process 50 may start a second timer to provide the user a second predetermined time period to determine whether to continue on the voice command interface. The second timer can be set to have a second predetermined expiration time period. In one embodiment, the second timer is set to be expired in 5 seconds. In other embodiments, an expiration time period of shorter than 5 seconds is used. In other embodiments, an expiration time period of longer than 5 seconds is used. However, an expiration time period of longer than 15 seconds is not preferable. In one embodiment, the second predetermined expiration time period is the same as the first predetermined expiration time period. In one embodiment, the second timer is the same as the first timer.

After the second timer has been started, or re-started, at block 76, the process 50 may advance to block 78.

At block 78, the portable electronic device 10 may activate a second speech recognition routine. For example, if the user is interested in learning the contents of the e-mail sent by Uncle John, the user may follow up, in a predetermined time period, by saying a predefined command or command string. For example, the user may say "play the e-mail" or just "play it."

In one embodiment, the process 50 may advance to block 80 while the second speech recognition routine continues to run at block 78.

At block 80, speech words, in text form, can be analyzed to determine whether at least one of the one or more predefined commands or command strings is included. If the speech words do not include at least one of the one or more predefined command strings at block 80, the process 50 may advance to block 84.

At block 84, the portable electronic device 10 may determine whether the second timer set at block 76 has been expired. If the second timer has not been expired, the process 50 may return to block 80. However, if at block 64, the second timer has been expired and the portable electronic device 10 has not detected any predefined command word, which may indicate that the user does not wish to use the voice command interface to communicate with the portable electronic device 10 anymore, the process 50 may advance to block 92 to deactivate all speech recognition routines. The activities at block 66 can now be considered complete.

However, if at block 80, the received speech words include at least one of one or more predetermined commands, the process 50 may advance to block 82.

At block 82, the portable electronic device 10 may play a message, send a message, or perform other actions as requested by the user.

In one embodiment, the portable electronic device 10 may be configured to launch a voice to text translator and send an e-mail or text message in response to the user's command. For example, if the user wishes to reply the e-mail sent from Uncle John, the user may say a follow-up command within a second predetermined time period (e.g., 5 seconds). For example, the user may say "reply with 'thank you, will get back to you later.'"

In the example above, "reply with" can be a predetermined command. The portable electronic device 10 will then only send out a response with "thank you, will get back to you later." In one embodiment, the portable electronic device 10 may play a draft response message via the speaker 24 and ask for a confirmation from the user before sending out the response message.

After the completion of the activities at block 82, the process 50 may return to block 76.

Once the process 50 is at block 66, it may take as much time as the user wishes to interface with the portable electronic device 10 by a loop or loops formed by blocks 76, 78, 80, 82 and 84 until no further command or command string has been received within the second predetermined expiration time period set on the second timer after the portable electronic device 10 has performed its function at block 74, 82 or 88. In this configuration, the second timer can be set more than one times as long as the user wishes to interface with the portable electronic device 10.

In one embodiment, the predefined keyword detected at block 62 is a password (as previously described) followed by a command string as the process 50 goes through blocks 72, 86 and 88. For example, the password can be "grandma" set by the user and the predetermined command string can be "play it." The user may just say "grandma, play it."

In response to a password followed by a predefined command string, the portable electronic device 10 may launch an application corresponding to the command string (block 88). For example, the portable electronic device 10 may play the received message through the speaker 24. In this manner, the user may be able to hear the message (in the case of an e-mail message) faster compared to that the user says a password, then the portable electronic device 10 plays a brief, then the user says a command, then the portable electronic device 10 plays the message.

Because a password is required, the user can control whether he/she wants to use the voice command interface when a message has been arrived. For example, when the user is in a vehicle with some other friends, the user may not want to let other people know who just sent an e-mail or text message and what is inside the e-mail or text message. In that case, the user can just omit the use of the password (e.g., grandma) for a predetermined time period (e.g., 5 seconds). All of the speech recognition routines will then be deactivated until the next new message arrives.

In one embodiment, the portable electronic device 10 can be configured to allow the user to decide whether a password is desirable to be used. The decision can be made before the process 50 starts.

In one embodiment, the portable electronic device 10 may be configured to skip the password and the at least one of the one or more keywords detected at block 62 is simply a command string (block 90). For example, the user can just say a predefined command string "play it" at block 62. In response to the command string, the portable electronic device 10 may launch an application corresponding to the command string (block 88). For example, if the message is a text message sent from Auntie Annie, the portable electronic device 10 may play a brief and the contents of the text message through the speaker 24 by playing "text message sent from Auntie Annie as the following: 'I will drop by soon.'" The process 50 may then advance to block 76.

If the portable electronic device 10 detects no more command, the process 50 may then advance to block 92 to deactivate all speech recognition routines. The activities at block 66 can be considered as complete.

Referring back to FIG. 2, after the completion of all activities at block 66, the process 50 may end at block 70. The process 50 may then start again at block 52.

In one embodiment, the process 50 may run continually (or at least substantially continually). Even thought the process 50 runs in a continuing manner, the voice command interface is not activated most of the time until a message is received and it only stay for a short predetermined time period (e.g., 5 seconds) if no predefined keyword is detected during the short predetermined time period. If a predefined keyword is detected and the user is done with the voice command interface, in one embodiment, the voice command interface can be deactivated when the user has no further command in a predetermined period of time (e.g., 5 seconds). Therefore, power can be saved dramatically while the user enjoys the convenience of portable voice command interface.

In one embodiment, the speech recognition routines described herein may be performed by the portable electronic device 10, by a server with which portable electronic device 10 communicates, or by a combination thereof.

In some embodiments, the process 50 can be components of the operating system of the portable electronic device 10. In other embodiments, the exemplary process 50 can be components of an application or widget installed on the portable electronic device 10, such as an application or widget downloaded from an online application store.

In some embodiments, the exemplary process 50 can be implemented, in part, in response to a processor (e.g., the processor 12) executing one or more sequences of one or more instructions contained in a memory (e.g., the memory 14). Such instructions may be read into the memory from a computer-readable storage medium. Execution of the sequences of instructions contained in the memory causes the processor to perform the process steps described herein. In alternative embodiments, hard-wired circuitry may be used in place of or in combination with software instructions to implement the embodiments described herein. Thus, embodiments described herein are not limited to any specific combination of hardware circuitry and software.

The term "computer-readable storage medium" as used herein refers to any medium that participates in providing instructions to processor for execution. Such a medium may take many forms, including non-volatile media and volatile media. Non-volatile media includes, for example, a PROM, an EPROM, a FLASH-EPROM or an optical disk.

As described above, a portable electronic device configured according to the disclosed embodiments may enable a user to enjoy the advantages of controlling the portable electronic device via voice commands without the limitation of having to either press or hold a physical button or switch on the portable electronic device or manually activate a virtual button or switch on a graphical user interface of the portable electronic device.

In addition, battery power can be saved dramatically because the voice command interface is only activated for a short time period when it may be the most desirable time for the user to know more about the message which has just been received. In addition, the user can enjoy a real portability without the need of an external power source. In addition, the user may not be interrupted by the portable electronic device accidently as a continuously run voice command interface will do. In addition, the user can control whether the content of the message is to be shared with other people around.

Although the present invention has been described in accordance with the embodiments shown, it may be apparent to those skilled in the art that various modifications, variation and improvements of the embodiments described herein may be made in the light of the above teachings and within the purview of the appended claims without departing from the spirit and intended scope of the invention. In addition, those areas in which it is believed that those of ordinary skill in the art are familiar have not been described herein in order to not unnecessary obscure the embodiments described herein. Accordingly, it is to be understood that the invention is not to be limited by the specific illustrative embodiments.

What is claimed is:

1. A method for activating a voice command interface in a portable electronic device, comprising:
   receiving a message by the portable electronic device;
   starting a first timer having a first predetermined expiration time period;
   activating a first speech recognition routine;
   determining whether a predefined keyword is detected before the first timer expires; and
   providing a voice brief corresponding to the message if the predefined keyword is detected, wherein the detected keyword is a password.

2. The method of claim 1, further comprising:
   determining whether a voice command interface is available before the step of receiving a message by the portable electronic device.

3. The method of claim 1, further comprising:
   deactivating the first speech recognition routine after the first timer has been expired.

4. The method of claim 1, further comprising:
   starting a second timer having a second predetermined expiration time period after the step of providing a voice brief corresponding to the message if the predefined keyword is detected.

5. The method of claim 4, further comprising:
   activating a second speech recognition routine after the step of starting a second timer.

6. The method of claim 5, further comprising:
   determining whether a predefined command string is detected after the step of activating a second speech recognition routine.

7. The method of claim 6, further comprising:
   sending a returned message after the step of determining whether a predefined command string is detected.

8. The method of claim 7, further comprising:
   deactivating the second speech recognition routine after the second timer has been expired.

9. The method of claim 1, wherein the password is a combination of a speech word and the user's voice characteristics.

10. A method for activating a voice command interface in a portable electronic device, comprising:
    receiving a message by the portable electronic device;
    starting a first timer having a first predetermined expiration time period;
    activating a first speech recognition routine;
    determining whether a predefined keyword is detected before the first timer expires; and
    providing a voice brief corresponding to the message if the predefined keyword is detected, wherein the detected keyword is a password followed by a command string.

* * * * *